United States Patent
Hsu et al.

(10) Patent No.: US 12,175,180 B2
(45) Date of Patent: *Dec. 24, 2024

(54) SYSTEMS AND METHODS FOR CONTEXT AWARE CIRCUIT DESIGN

(71) Applicant: Taiwan Semiconductor Manufacturing Co., Ltd., Hsinchu (TW)

(72) Inventors: Li-Chung Hsu, Hsin-Chu (TW); Yen-Pin Chen, Taipei (TW); Sung-Yen Yeh, Jiadong Township, Pingtung County (TW); Jerry Chang-Jui Kao, Taipei (TW); Chung-Hsing Wang, Hinchu County (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/232,742

(22) Filed: Aug. 10, 2023

(65) Prior Publication Data

US 2023/0401369 A1    Dec. 14, 2023

Related U.S. Application Data

(60) Division of application No. 17/370,717, filed on Jul. 8, 2021, now Pat. No. 11,816,413, which is a
(Continued)

(51) Int. Cl.
*G06F 30/392*   (2020.01)
*G06F 30/367*   (2020.01)
(Continued)

(52) U.S. Cl.
CPC .......... *G06F 30/392* (2020.01); *G06F 30/367* (2020.01); *G06F 2113/18* (2020.01); *G06F 2119/06* (2020.01)

(58) Field of Classification Search
CPC .. G06F 30/392; G06F 30/367; G06F 2113/18; G06F 2119/06
(Continued)

(56) References Cited

U.S. PATENT DOCUMENTS 7,882,471 B1 *   2/2011   Kariat .................. G06F 30/367
                                                      716/113
8,656,331 B1     2/2014   Sundareswaran et al.
(Continued)

*Primary Examiner* — Suresh Memula
(74) *Attorney, Agent, or Firm* — Duane Morris LLP

(57) ABSTRACT

Systems and methods for context aware circuit design are described herein. A method includes: identifying at least one cell to be designed into a circuit; identifying at least one context parameter having an impact to layout dependent effect of the circuit; generating, for each cell and for each context parameter, a plurality of abutment environments associated with the cell; estimating, for each cell and each context parameter, a sensitivity of at least one electrical property of the cell to the context parameter by generating a plurality of electrical property values of the cell under the plurality of abutment environments; and determining whether each context parameter is a key context parameter for a static analysis of the circuit, based on the sensitivity of the at least one electrical property of each cell and based on at least one predetermined threshold.

20 Claims, 10 Drawing Sheets

Related U.S. Application Data continuation of application No. 16/836,370, filed on Mar. 31, 2020, now Pat. No. 11,068,637.

(51) Int. Cl.
 *G06F 113/18* (2020.01)
 *G06F 119/06* (2020.01)

(58) Field of Classification Search
 USPC .................................................... 716/122
 See application file for complete search history.

(56) References Cited

U.S. PATENT DOCUMENTS

| | | | |
|---|---|---|---|
| 8,713,501 B1 | 4/2014 | Le et al. | |
| 9,633,159 B1* | 4/2017 | Parikh | H01L 21/00 |
| 9,875,333 B1 | 1/2018 | Verma et al. | |
| 10,185,795 B1* | 1/2019 | Keller | G06F 30/3312 |
| 10,776,547 B1 | 9/2020 | Gupta et al. | |
| 10,990,733 B1* | 4/2021 | Garg | G06F 30/3315 |
| 11,068,637 B1* | 7/2021 | Hsu | G06F 30/367 |
| 11,531,802 B2* | 12/2022 | Jiang | G06N 3/065 |
| 2006/0090150 A1* | 4/2006 | Kucukcakar | G06F 30/3312 |
| | | | 716/113 |
| 2009/0013292 A1* | 1/2009 | Brunet | G06F 30/3312 |
| | | | 716/113 |
| 2009/0037855 A1* | 2/2009 | Tanefusa | G06F 30/3312 |
| | | | 716/106 |
| 2013/0227510 A1 | 8/2013 | Katz et al. | |
| 2013/0239079 A1* | 9/2013 | Tetelbaum | G06F 30/3312 |
| | | | 716/113 |
| 2014/0082576 A1 | 3/2014 | Shaikh et al. | |
| 2015/0370955 A1* | 12/2015 | Ahlen | G06F 30/3312 |
| | | | 716/113 |
| 2016/0357894 A1* | 12/2016 | Frederick, Jr. | G06F 30/3312 |
| 2017/0083661 A1* | 3/2017 | Bickford | G06F 30/327 |
| 2017/0185709 A1* | 6/2017 | Frederick, Jr. | G06F 30/3312 |
| 2017/0262569 A1 | 9/2017 | Huynh et al. | |
| 2020/0026812 A1 | 1/2020 | Feng et al. | |
| 2021/0117603 A1* | 4/2021 | Jiang | G06N 3/065 |

* cited by examiner

| | AR spacing on left side only | AR spacing on right side only | AR spacing on left/right side |
|---|---|---|---|
| Spacing pitch=1 | 312 | 314 | 316 |
| Spacing pitch=2 | 322 | 324 | 326 |
| Spacing pitch=n | extend spacing pitch to n space on the left | extend spacing pitch to n space on the right | extend spacing pitch to n space on the left/right |

FIG. 3

```
pin (ZN)
...
timing () {
    ARSE_base_derate (derate_template_3x3) {
        type: rise_delay;
        index_1 ("0, 1, 3"); // left pitch
        index_2 ("0, 1, 3"); // right pitch
        values ( \
            "1.00, 1.05, 1.03", \
            "1.05, 1.02, 1.00", \      ~610
            "1.03, 1.00, 0.90" \
        );
        type: fall_delay;
        index_1 ("0, 1, 3"); // left pitch
        index_2 ("0, 1, 3"); // right pitch
        values ( \
            "1.00, 1.05, 1.07", \
            "1.05, 1.09, 1.10", \      ~620
            "1.07, 1.10, 1.15" \
        );
    }
...
}
```

SYSTEMS AND METHODS FOR CONTEXT AWARE CIRCUIT DESIGN

CROSS-REFERENCE TO RELATED APPLICATION

This application is a division of U.S. patent application Ser. No. 17/370,717, filed Jul. 8, 2021, which is a continuation of U.S. patent application Ser. No. 16/836,370, filed on Mar. 31, 2020, now U.S. Pat. No. 11,068,637, each of which is incorporated by reference herein in their entireties.

BACKGROUND

Modern design processes for integrated circuits make extensive use of modular components. Circuit designers produce design descriptions, typically at a register-transfer level (RTL). The RTL source description (e.g., Verilog code) is compiled into instances of "cells." The cells are basic building blocks of circuits, such as gates or memory bit cells. Cells implement logic or other electronic functions. Various foundries and independent cell library vendors provide standard cell libraries. The cells in these libraries have been modeled and qualified, for use with a particular integrated circuit technology. Electronic Design Automation (EDA) tools can perform an automatic place and route (APR), by placing the selected standard cells at appropriate locations in the IC floor plan, and routing the interconnections between the various cells to generate an IC layout. After a layout is generated, a series of verification and acceptance procedures are performed. When a design has passed its verification procedures, a signoff is performed before the design is taped out.

An IC designer designs circuits using the standard cell libraries that are available at the time a given IC is designed. A current standard cell library assumes a fixed characterization environment and provides standard electrical information for each cell. However, a given cell might be used in different environments or contexts. A conventional method pre-characterizes all possible standard cell abutment environments, which is not practical because of the high time complexity. While standard cell abutment environment can be extracted to do post layout characterization, the approach is very time consuming and impractical in a design with a large number of gate count, e.g. millions. In addition, to protect their intellectual properties, IC designers may not want to expose their detailed layout information to their customers.

As such, the existing circuit designs are not entirely satisfactory to overcome the above mentioned drawbacks.

BRIEF DESCRIPTION OF THE DRAWINGS

Various exemplary embodiments of the present disclosure are described in detail below with reference to the following Figures. The drawings are provided for purposes of illustration only and merely depict exemplary embodiments of the present disclosure to facilitate the reader's understanding of the present disclosure. Therefore, the drawings should not be considered limiting of the breadth, scope, or applicability of the present disclosure. It should be noted that for clarity and ease of illustration these drawings are not necessarily drawn to scale.

FIG. 3 illustrates various abutment environments for key context parameter identification and clarification, in accordance with some embodiments of the present disclosure.

FIG. 6 illustrates a part of an algorithm 600 for generating derate tables, in accordance with some embodiments of the present disclosure.

DETAIL DESCRIPTION

Figure 1:
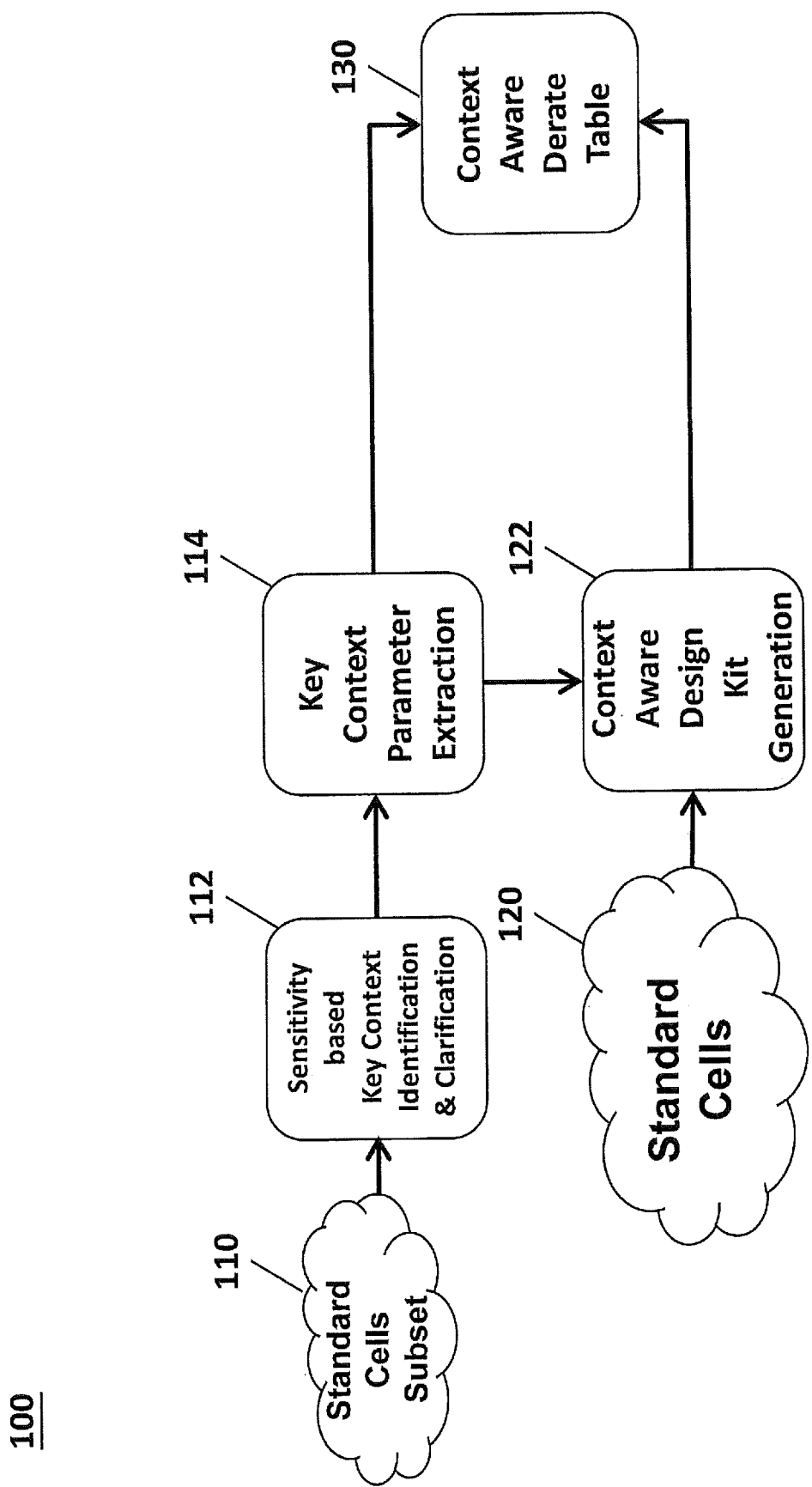
FIG. 1 illustrates a method for generating a context aware derate table, in accordance with some embodiments of the present disclosure.

Various exemplary embodiments of the present disclosure are described below with reference to the accompanying figures to enable a person of ordinary skill in the art to make and use the present disclosure. As would be apparent to those of ordinary skill in the art, after reading the present disclosure, various changes or modifications to the examples described herein can be made without departing from the scope of the present disclosure. Thus, the present disclosure is not limited to the exemplary embodiments and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. Terms such as "attached," "affixed," "connected" and "interconnected," refer to a relationship wherein structures are secured or attached to one another either directly or indirectly through intervening structures, as well as both movable or rigid attachments or relationships, unless expressly described otherwise.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Reference will now be made in detail to the present embodiments of the disclosure, examples of which are illustrated in the accompanying drawings. Wherever possible, the same reference numbers are used in the drawings and the description to refer to the same or like parts.

The present disclosure provides systems and methods for a context aware circuit design, to allow a design signoff to be aware of cell context in simplified and secure format to protect intellectual property (IP) while keeping the ability to evaluate a fluctuation of circuit electrical property, e.g. leakage, power or timing information, more quickly and accurately. In one embodiment, a disclosed system can adaptively tune the electrical property information during the automatic place and route (APR) or signoff stage, being aware of the actual surround environment of each cell for an accurate design signoff with minimum key context information.

The present disclosure provides a method to turn layout effect on and off to derive a sensitivity of electrical properties in response to different layouts or different abutment environments. Based on the sensitivity, critical layout effects or key context parameters are identified for extraction. Based on the extracted key context parameters, electrical property values are calculated to generate a parameterized context aware derate table, which is used for timing and/or power estimation with respect to layout effect during the APR or signoff stage. Instead of considering just best and worst case abutment environments, a circuit design based on the parameterized context aware derate table provides a better adaption to real case abutment environment, based on lookup and/or interpolation.

The disclosed method can help a designer to identify a weak spot in layout before the tape-out stage, which improves overall performance, e.g. in terms of power or area consumption, at the chip design level. In addition, the disclosed method can minimize IP information exposure to end user while keeping a high accuracy of electrical property estimation with respect to layout effect, which reduces an arbitrary margin inaccuracy due to worst or best case standard cell characterization.

FIG. 1 illustrates a method 100 for generating a context aware derate table, in accordance with some embodiments of the present disclosure. As shown in FIG. 1, the method 100 includes a sensitivity based key context identification and clarification 112, followed by a key context parameter extraction 114. The sensitivity based key context identification and clarification 112 is performed to identify whether a context parameter is a key context parameter or not based on a sensitivity of electrical properties to the context parameter of cells in a subset 110 of standard cells. The key context parameter extraction 114 is performed to extract key context parameters identified at operation 112.

According to various embodiments, a context parameter may include information related to: an active region (AR) spacing effect associated with a cell, a poly pitch, or a poly length associated with a cell. According to various embodiments, an electrical property mentioned herein may include information related to: a rising delay, a falling delay, a constraint, a leakage or a power associated with a cell. In one embodiment, determining whether a context parameter is a key context parameter includes: determining, for each cell, whether the sensitivity of an electrical property of the cell exceeds a predetermined threshold; and identifying the context parameter as a key context parameter when the sensitivity of the electrical property of any cell exceeds the predetermined threshold.

As shown in FIG. 1, the method 100 includes a context aware design kit generation 122 and a context aware derate table 130. The context aware design kit generation 122 is performed to generate one or more context aware cell libraries based on the standard cells 120 and the extracted key context parameters. The context aware derate table 130 may be generated based on the key context parameters extracted at operation 114 and the one or more context aware cell libraries generated at 122. A detailed description of these operations in FIG. 1 will be shown below.

Figure 2:
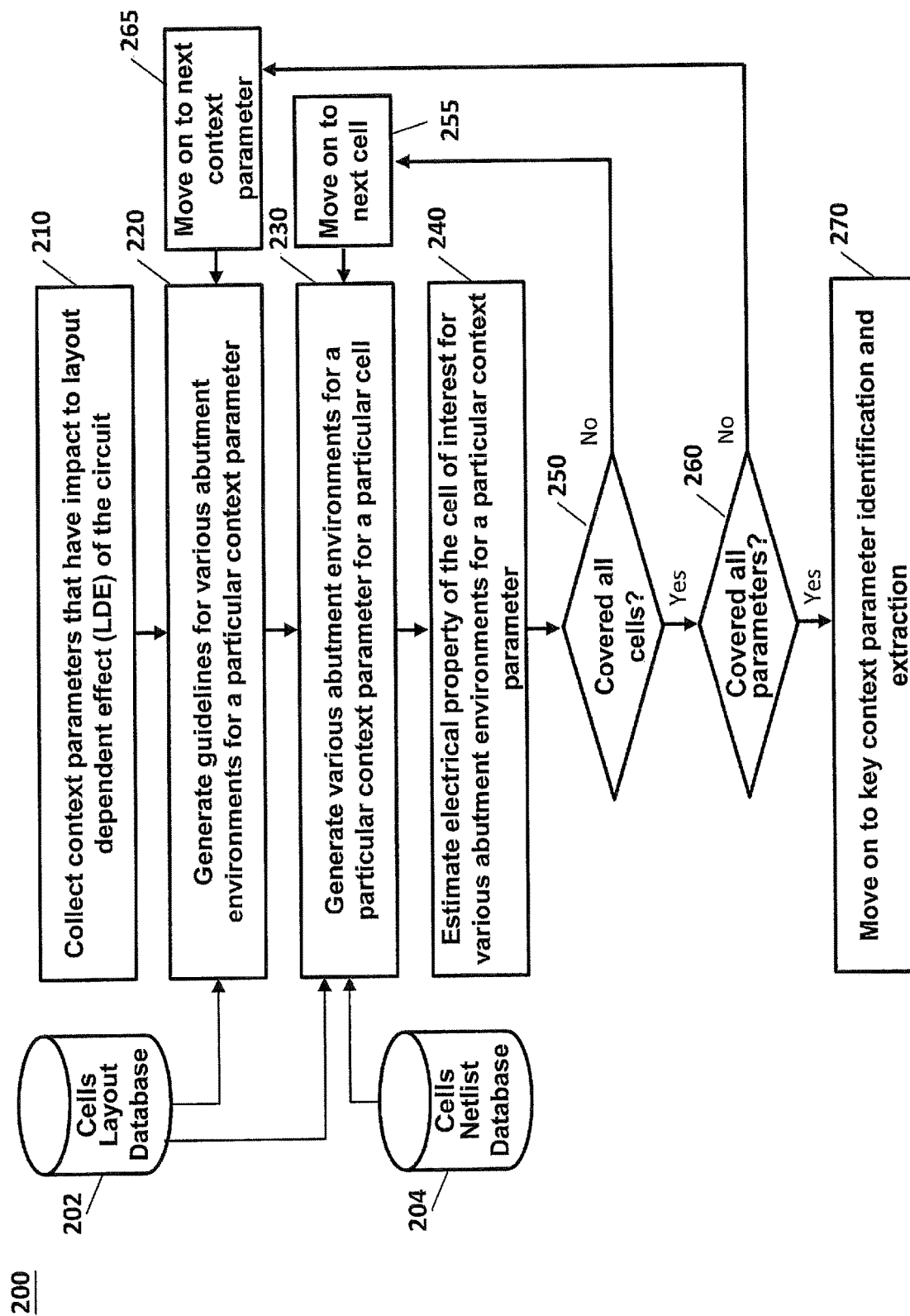
FIG. 2 illustrates a method for collecting electrical properties for each context parameter which has impact to layout dependent effect, in accordance with some embodiments of the present disclosure.

FIG. 2 illustrates a method 200 for collecting electrical properties for each context parameter which has impact to layout dependent effect, in accordance with some embodiments of the present disclosure. At operation 210, a plurality of context parameters that may have an impact to layout dependent effect (LDE) of the circuit are collected. At operation 220, guidelines are generated for various abutment environments for one of the plurality of context parameters based on a cells layout database 202.

In one embodiment, even though the layout dependent effect might take a relative long distance to saturate (in the range of 10 to 20 poly pitches), standard cell libraries can be designed such that any given cell in APR only see a much smaller subset compared to 10 to 20 poly pitches. In the case of AR spacing effect (ARSE), which describes the AR spacing to the left and right of a device, the standard cell library can be designed such that any given cell will only see less than 2 CPP of AR spacing. The guidelines for various abutment environment describes the actual range of layout depended effect that can be seen in the real APR usage. This can help to narrow down the scope of layout dependent effect, and help to make the derate table to be more focused on the most relevant range for APR abutment. According to various embodiments, the layout dependent effect may be a threshold voltage, a timing delay, or other circuit effects dependent on layout.

At operation 230, various abutment environments are generated for one of the plurality of context parameters from the cells layout database 202 and for one of cells from a cells netlist database 204. In one embodiment, a cell netlist is an abstract view showing the input and output pins with the transistor connectivity and transistor sizing. This abstract view may be used in RC extraction to create cross reference net name.

Then at operation 240, electrical property of the cell of interest is estimated for various abutment environments for the particular context parameter and the particular cell. Then at operation 250, it is determined whether all cells are covered for the electrical property estimation. If so, the process continues to operation 260; if not, the process goes to operation 255 to move on to next cell and goes back operation 230 to generate various abutment environments for the next cell.

At operation 260, it is determined whether all context parameters are covered for the electrical property estimation. If so, the process continues to operation 270; if not, the process goes to operation 265 to move on to next context parameter and goes back operation 220 to generate various abutment environments based on the next context parameter. In this manner, electrical properties for each context parameter which has impact to LDE are collected. At operation 270, the process moves on to key context parameter identification and extraction, whose detailed operations will be described later referring to FIG. 4.

FIG. 3 illustrates various abutment environments for key context parameter identification and clarification, in accordance with some embodiments of the present disclosure. As shown in FIG. 3, AR spacing effect is used as an exemplary context parameter with respect to which electrical property values for different abutment environments are collected and to be compared to an electrical property value for a baseline abutment environment with no AR spacing.

AR spacing on the left and on the right of a cell 301 of interest can be different and are both considered in FIG. 3. As show in FIG. 3, a cell 301 may be an invertor having a power ground area 305 and an OD area 306. The cell 301 is surrounded by dummy cells 302 with AR spacing 303 in different positions relative to the cell 301 in different abutment environments shown in FIG. 3. For example, in the abutment environment 312 shown in FIG. 3, the AR spacing 303 is only on the left side of the cell 301 and has a spacing pitch equal to 1, meaning a spacing distance of one cell. In the abutment environment 314, the AR spacing is only on the right side of the invertor cell and has a spacing pitch equal to 1. In the abutment environment 316, an AR spacing with a pitch equal to 1 is on both the left side and the right side of the invertor cell. In the second row of FIG. 3, the abutment environments 322, 324, 326 are similar to the abutment environments 312, 314, 316, respectively, except that the AR spacing in the abutment environments 322, 324, 326 has a spacing pitch equal to 2, meaning a spacing distance of two cells. Following this manner, additional abutment environments (not shown in FIG. 3) can be derived with the number of AR spacing extended to n.

For each of the listed abutment environments shown in FIG. 3, a simulation may be run to estimate an electrical property value of the cell 301 of interest for circuit design. During chip implementation, the cell 301 of interest may be surrounded by other cells, whose functions are unknown before the APR stage, to form a specific abutment environment for the cell 301 of interest. The specific abutment environment may be same as or similar to one of the listed abutment environments in FIG. 3. As such, the estimated electrical property value corresponding to the specific abutment environment can be identified during the chip implementation and the signoff stage.

A similar process may be performed for other cells of interest as well. While AR spacing on the left and right of a cell of interest is used as an exemplary context parameter in FIG. 3, AR spacing above and below a cell of interest can be used as another exemplary context parameter in some embodiments.

Figure 4:
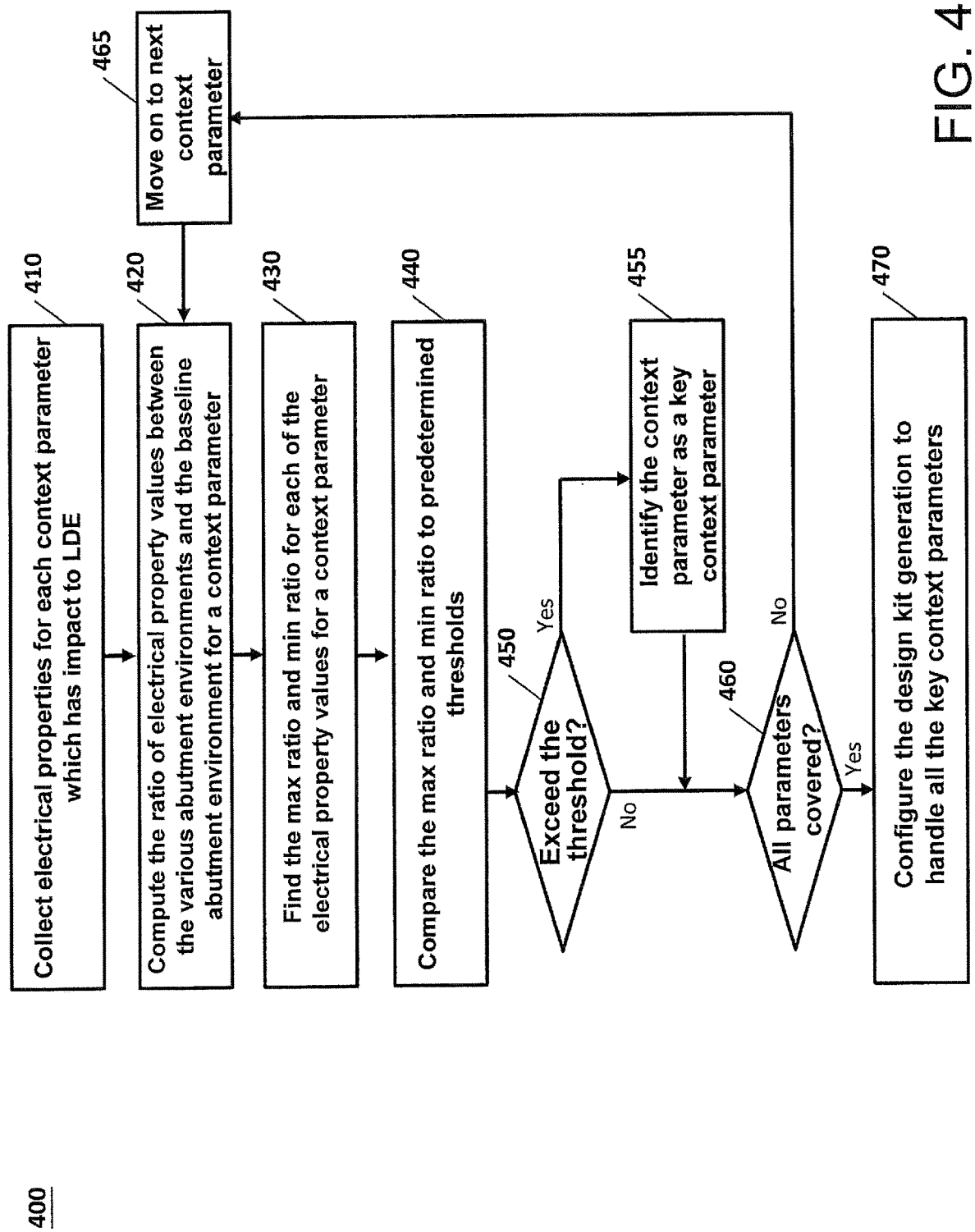
FIG. 4 illustrates a method for key context parameter identification and extraction, in accordance with some embodiments of the present disclosure.

FIG. 4 illustrates a method 400 for key context parameter identification and extraction, in accordance with some embodiments of the present disclosure. At operation 410, electrical property values for each context parameter which has impact to LDE are collected. In one embodiment, the operation 410 may include detailed operations shown in FIG. 2. At operation 420 in FIG. 4, a ratio is computed for a context parameter, between each of the electrical property values corresponding to different abutment environments and an electrical property value corresponding to a baseline abutment environment associated with a cell of interest. For example, when AR spacing is used as the context parameter with respect to which electrical property values for different abutment environments are collected as shown in FIG. 3, a baseline abutment environment can be a case with no AR spacing around the cell of interest. As such, the operation 420 generates a plurality of ratios each of which corresponding to one of the abutment environments associated with the cell.

At operation 430, a maximum ratio and a minimum ratio among the plurality of ratios are identified for the cell and for the context parameter. At operation 440, the maximum ratio and the minimum ratio are compared to predetermined thresholds. For example, the maximum ratio is compared to a first predetermined threshold; and the minimum ratio is compared to a second predetermined threshold. At operation 450, it is determined whether any of the thresholds is exceeded. That is, two conditions are checked at operation 450: whether the maximum ratio is larger than or equal to the first predetermined threshold, and whether the minimum ratio is smaller than or equal to the second predetermined threshold. If either condition is satisfied, the process goes to operation 455 to identify the context parameter as a key context parameter. Otherwise, if none of the conditions is satisfied, the process goes to operation 460.

At operation 460, it is determined whether all context parameters are covered. If so, the process goes to operation 470 to configure design kit generation based on all of the identified key context parameters. If not, the process goes to operation 465 to move on to next context parameter, and goes back to operation 420 to compute electrical property ratios for the next context parameter.

The plurality of ratios of electrical property values here represents a sensitivity of an electrical property of the cell of interest to the context parameter. As such, the method 400 essentially determines whether each context parameter is a key context parameter, based on the sensitivity of the electrical property of the cell of interest and based on some predetermined thresholds.

In one embodiment, the operations 420 to 440 can be performed for each cell of interest selected from a subset of standard cells for designing the circuit. At operations 450 to 455, the current context parameter is identified as a key context parameter when the above mentioned threshold condition associated with the current context parameter is satisfied for any cell of interest.

In one embodiment, electrical property values for different types of electrical properties are collected for each context parameter at operation 410. For example, values related to a rising delay, a falling delay, a constraint, a leakage, and a power may all be collected. In this case, the operations 420 to 440 can be performed for each type of electrical property. At operations 450 to 455, the current context parameter is evaluated to be a key context parameter with respect to each electrical property respectively. That is, the method 400 may determine whether each context parameter is a key context parameter for each electrical property respectively, based on the sensitivity of the respective electrical property of the selected cells.

Figure 5:
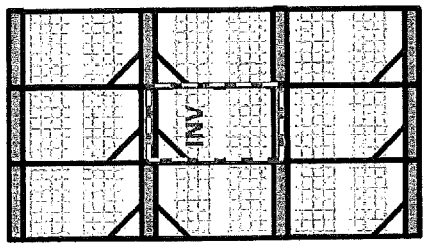
FIG. 5 illustrates an exemplary calculation of an electrical property ratio, in accordance with some embodiments of the present disclosure.
Figure 5:
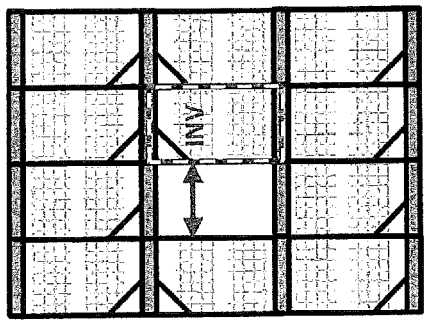

FIG. 5 illustrates an exemplary calculation of an electrical property ratio, in accordance with some embodiments of the present disclosure. As discussed above, a sensitivity of an electrical property can be measured by determining different electrical property values of a cell under different abutment environments having impact to LDE, and determining a ratio between each of the electrical property values and a baseline electrical property value under a baseline abutment environment. In the embodiment shown in FIG. 5, the cell of interest is an invertor; AR spacing effect (ARSE) is used as an example of a context parameter with respect to which different abutment environments around the invertor cell of interest can be derived; and the rise delay of the invertor is used as an example of the electrical property to be measured.

As shown in FIG. 5, both a baseline abutment environment 510 and an LDE impacted abutment environment 520 are illustrated for the invertor. In the baseline abutment environment 510, the invertor is surrounded by dummy cells without any AR spacing on the left or right side of the invertor. That is, the ARSE pitch is 0 for the invertor both on the left side and on the right side of the invertor. In the LDE impacted abutment environment 520, the invertor is surrounded by dummy cells with an AR spacing of one dummy cell on the left side of the invertor, but without any AR spacing on the right side of the invertor. To be specific, the ARSE pitch is 1 on the left side of the invertor and the ARSE pitch is 0 on the right side of the invertor. In this case, a first rise delay of the invertor can be obtained by creating an actual abutment case under the baseline abutment environment 510; and a second rise delay of the invertor can be obtained by creating an actual abutment case under the LDE impacted abutment environment 520. That is, abutment environments are created for test cases 520 and 510 to obtain the actual delays through simulation. Then a delay ratio between the 2 cases can be computed, e.g. to be 1.05.

Then an electrical property ratio can be calculated between the second rise delay and the first rise delay, i.e. dividing the second rise delay estimated from the LDE impacted abutment environment 520 by the first rise delay estimated from the baseline abutment environment 510. As discussed above, different AR spacing environments may have layout dependent effect on the cell of interest. That is, different AR spacing environments 510, 520 may cause the invertor of interest to have different values with respect to a same electrical property, e.g. different rise delays. As such, the first rise delay may be different from the second rise delay. In the example shown in FIG. 5, the second rise delay is 1.05 times the first rise delay, i.e. the electrical property ratio calculated in FIG. 5 is equal to 1.05.

While FIG. 5 shows a calculation of an electrical property ratio for one LDE impacted abutment environment (i.e. ARSE left pitch=1 and ARSE right pitch=0), different electrical property ratios can be calculated for different LDE impacted abutment environments, e.g. the different AR spacing environments shown in FIG. 3. A derate table can be formed based on these electrical property ratios, where each element in the derate table is a ratio of an electrical property of a cell under a corresponding abutment environment.

FIG. 6 illustrates a part of an algorithm 600 for generating derate tables, in accordance with some embodiments of the present disclosure. As shown in FIG. 6, two derate tables 610, 620 are generated for two electrical properties of a cell respectively, i.e. rise delay and fall delay of an invertor. Each derate table includes elements representing electrical property ratios under different ARSE pitch environments.

As shown in FIG. 6, during generation of each derate table, three cases of ARSE left pitch (equal to 0, 1, 3 respectively) are considered; and three cases of ARSE right pitch (equal to 0, 1, 3 respectively) are considered. As such, each derate table has a 3 by 3 structure, with a total of 9 elements, each of which corresponds to a combination of the considered ARSE left pitch and ARSE right pitch. For example, in the rise delay derate table 610 shown in FIG. 6, the element at the first row and the second column is 1.05, which is a rise delay ratio calculated as shown in FIG. 5. Each element in the rise delay derate table 610 is a ratio calculated from dividing a rise delay corresponding to a respective combination of the considered ARSE left pitch and ARSE right pitch by a rise delay corresponding to a fixed baseline environment, i.e. a combination of ARSE left pitch=0 and ARSE right pitch=0. As such, the element at the first row and the first column is 1, because its respective combination of the considered ARSE pitches is the same as the baseline environment, i.e. a combination of ARSE left pitch=0 and ARSE right pitch=0.

In one embodiment, a maximum ratio and a minimum ratio are identified from each derate table, and compared with predetermined thresholds. For example, a maximum ratio of the rise delay derate table in FIG. 6 is 1.05, and is compared with a first threshold; a minimum ratio of the rise delay derate table in FIG. 6 is 0.9, and is compared with a second threshold. The system would identify the ARSE pitch as a key context parameter with respect to rise delay, when either the maximum ratio 1.05 is larger than or equal to the first predetermined threshold, or the minimum ratio 0.9 is smaller than or equal to the second predetermined threshold. For example, when the first predetermined threshold is 1.1 and the second predetermined threshold is the ARSE pitch is identified as a key context parameter with respect to rise delay, because the minimum ratio 0.9 is equal to the second predetermined threshold 0.9. This means a sensitivity of the rise delay to the ARSE pitch is high enough to make ARSE pitch a key context parameter with respect to the rise pitch.

In another embodiment, the system would identify the ARSE pitch as a key context parameter with respect to rise delay, only when the maximum ratio 1.05 is larger than or equal to the first predetermined threshold. In this case, when the first predetermined threshold is 1.1, the ARSE pitch is not identified as a key context parameter with respect to rise delay, because the maximum ratio 1.05 is not larger than or equal to the first predetermined threshold 1.1. This means the sensitivity of the rise delay to the ARSE pitch is not high enough to make the ARSE pitch a key context parameter with respect to the rise pitch.

In yet another embodiment, the system would identify the ARSE pitch as a key context parameter with respect to rise delay, only when both the maximum ratio 1.05 is larger than or equal to the first predetermined threshold, and the minimum ratio 0.9 is smaller than or equal to the second predetermined threshold. In this case, when the first predetermined threshold is 1.1 and the second predetermined threshold is 0.9, the ARSE pitch is not identified as a key context parameter with respect to rise delay, because the maximum ratio 1.05 is not larger than or equal to the first predetermined threshold 1.1. This means the sensitivity of the rise delay to the ARSE pitch is not high enough to make the ARSE pitch a key context parameter with respect to the rise pitch.

With respect to the fall delay derate table 620, a maximum ratio of the fall delay derate table 620 in FIG. 6 is 1.15, and is compared with a third threshold; a minimum ratio of the fall delay derate table 620 in FIG. 6 is 1.00, and is compared with a fourth threshold. The system would identify the ARSE pitch as a key context parameter with respect to fall delay, when either the maximum ratio 1.15 is larger than or equal to the third predetermined threshold, or the minimum ratio 1.00 is smaller than or equal to the fourth predetermined threshold. For example, when the third predetermined threshold is 1.1 and the fourth predetermined threshold is 0.9, the ARSE pitch is identified as a key context parameter with respect to fall delay, because the maximum ratio 1.15 is larger than the third predetermined threshold 1.1. This means the sensitivity of the fall delay to the ARSE pitch is high enough to make the ARSE pitch a key context parameter with respect to the fall pitch.

In another embodiment, the system would identify the ARSE pitch as a key context parameter with respect to fall delay, only when the maximum ratio 1.15 is larger than or equal to the third predetermined threshold. In this case, when the third predetermined threshold is 1.1, the ARSE pitch is identified as a key context parameter with respect to fall delay, because the maximum ratio 1.15 is larger than the third predetermined threshold 1.1. In yet another embodiment, the system would identify the ARSE pitch as a key context parameter with respect to fall delay, only when both the maximum ratio 1.15 is larger than or equal to the third predetermined threshold, and the minimum ratio 1.00 is smaller than or equal to the fourth predetermined threshold. In this case, when the third predetermined threshold is 1.1 and the fourth predetermined threshold is 0.9, the ARSE pitch is not identified as a key context parameter with respect to fall delay, because the minimum ratio 1.00 is not smaller than or equal to the fourth predetermined threshold 0.9.

In one embodiment, the third predetermined threshold for the fall delay may be different from the first predetermined threshold for the rise delay; and the fourth predetermined threshold for the fall delay may be different from the second predetermined threshold for the rise delay. In one embodiment, a context parameter is determined to be a key context parameter or not for each cell of interest. In another embodiment, once a context parameter is determined to be a key context parameter for one cell, it would be identified as a key context parameter for any cell. In yet another embodiment, a context parameter is determined to be a key context parameter or not, by selecting a maximum ratio among all ratios for one type of derate table corresponding to all cells of interest, which may be a subset of standard cells for designing the circuit, and comparing the maximum ratio with a predetermined threshold. Similarly, the context parameter may also be determined to be a key context parameter or not, by selecting a minimum ratio among all ratios for one type of derate table corresponding to all cells of interest, and comparing the minimum ratio with a predetermined threshold.

The ARSE pitch in FIG. 6 is related to AR spacing on the left side and on the right side of a cell of interest. In one embodiment, another ARSE pitch related to AR spacing above and below a cell of interest may also be a context parameter to be evaluated as key context parameter or not.

Upon a determination that a context parameter is a key context parameter, the system may generate, for each cell, at least one derate table based on different abutment environments associated with the key context parameter and based on the ratios corresponding to the different abutment environments. For example, when the ARSE pitch is identified as a key context parameter with respect to rise delay, a rise delay derate table as shown in FIG. 6 may be generated and provided for a static analysis of the circuit during APR and/or signoff stages of the circuit design. As shown in FIG. 6, each derate table may be lookup table mapping AR spacing values associated with a cell to time delay values associated with the cell; and each of the time delay ratios is a ratio between a time delay value corresponding to a respective AR spacing value and a baseline time delay value corresponding to a baseline AR spacing value when the cell has no AR spacing.

In one embodiment, a context parameter is determined to be a key context parameter or not with respect to each electrical property. For example, as shown in FIG. 6, ARSE pitch may be determined to be a key context parameter or not with respect to rise delay and fall delay separately. In another embodiment, once a context parameter is determined to be a key context parameter for one electrical property, it would be identified as a key context parameter for any electrical property.

In one embodiment, a context parameter is determined to be a key context parameter or not with respect to all electrical properties, e.g. by generating a combination of the maximum ratios from different types of derate tables, and comparing the combination with a predetermined threshold. The combination may be a summation or an average. For example, an average of the maximum ratios 1.05 and 1.15 in the two derate tables in FIG. 6 is computed to be 1.10, and is equal to a predetermined threshold 1.1. As such, the ARSE pitch is identified as a key context parameter with respect to both the rise delay and the fall delay, or say with respect to a total time delay including the rise delay and the fall delay. In this case, a single derate table may be generated for both the rise delay and the fall delay, by taking the average of each two corresponding elements in the two derate tables shown in FIG. 6. In general, when a context parameter is determined to be a key context parameter with respect to all electrical properties, a single derate table may be generated based on all of the electrical properties of the cell, and provided for a static analysis of the circuit during APR and/or signoff stages of the circuit design.

In one embodiment, during the sensitivity based key context identification and clarification operation, a derate table does not need to be generated, so long as a maximum ratio and/or a minimum ratio can be identified and compared to predetermined thresholds for the key context identification. The derate table(s) may be generated and provided after a key context parameter is identified, and with respect to abutment environments associated with the identified key context parameter only.

Figure 7:
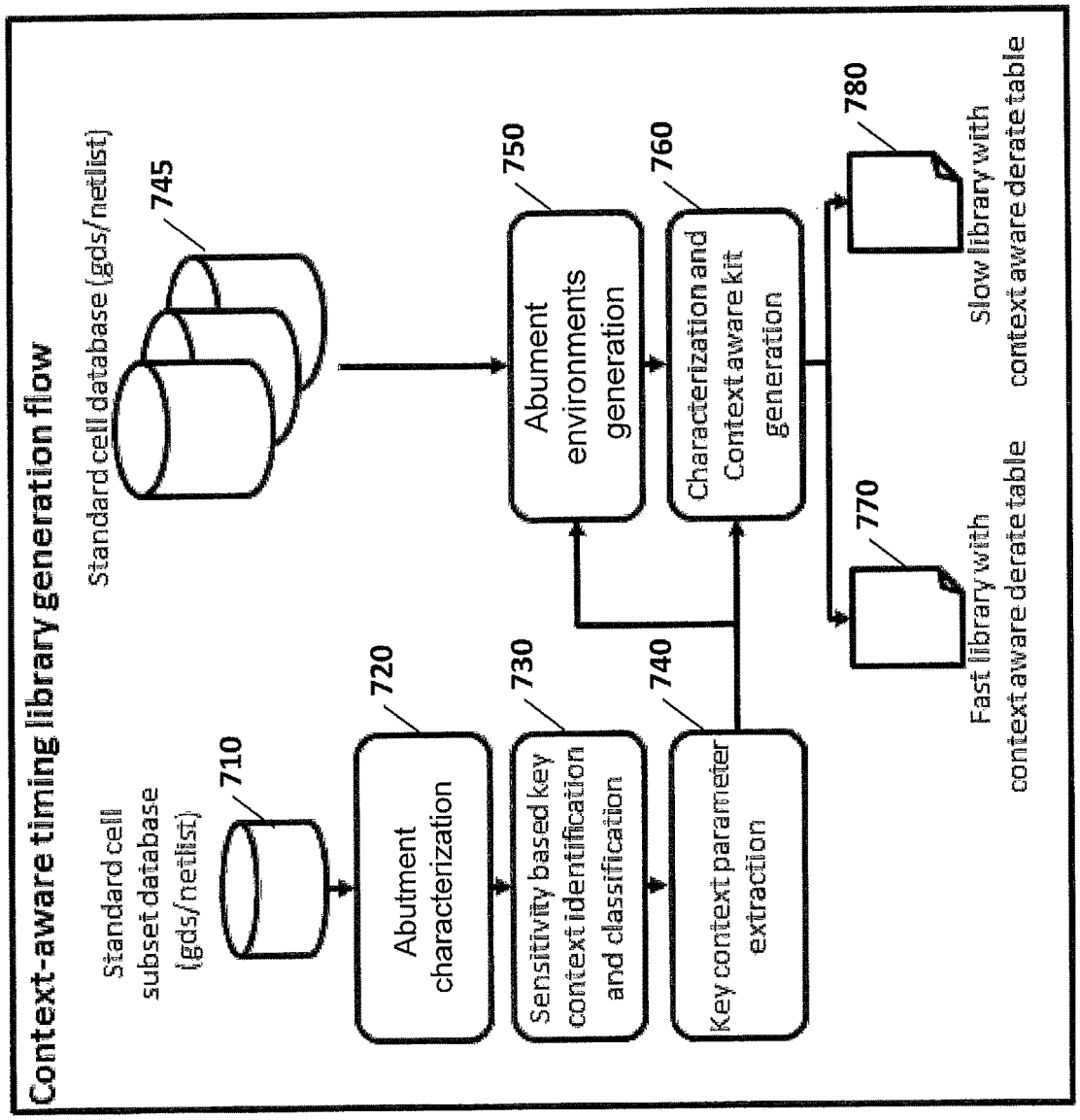
FIG. 7 illustrates an exemplary flow for context aware timing library generation in a circuit design, in accordance with some embodiments of the present disclosure.

FIG. 7 illustrates an exemplary flow 700 for context aware timing library generation in a circuit design, in accordance with some embodiments of the present disclosure. A context aware timing library is a cell library including context information of the cells in the library, e.g. a context aware derate table as discussed above. As shown in FIG. 7, an abutment characterization is performed at operation 720 to identify different context parameters that may have an impact to layout dependent effect, based on a subset of standard cells in a database 710. The database 710 may have cells with a gds format and a cell netlist, which is an abstract view showing the input and output pins with transistor connectivity and transistor sizing.

These context parameters may be called candidate context parameters. At operation 730, a sensitivity based key context identification and classification is performed to identify the key context parameters among the candidate context parameters. As such, the candidate context parameters are classified into a key group and a non-key group. Then, the key context parameters are extracted at operation 740.

At operation 750, different abutment environments are generated based on the standard cell database 745. In one embodiment, the different abutment environments are generated based on the key context parameters extracted at operation 740. Then at operation 760, the abutment environments are characterized to generate a context aware kit. The kit includes cell libraries with context aware derate tables to be used for circuit design during APR and signoff stages. For example, a fast library 770 may be generated based on standard cells with best case abutment environments in terms of timing delay; and a slow library 780 may be generated based on standard cells with worst case abutment environments in terms of timing delay. Each cell library is generated with a context aware derate table as discussed above, and provided for a context aware static timing analysis in an APR and/or signoff stage.

In general, the cell libraries and context aware derate tables may be generated with respect to any electrical property of the cells, e.g. timing delay, power consumption, leakage, constraints, etc. Accordingly, the cell libraries and context aware derate tables may be used in any static analysis of the circuit, e.g. a static timing analysis or a static power analysis.

In one embodiment, a context aware static analysis of a circuit includes: determining a baseline value of an electrical property associated with the circuit; obtaining a design layout of the circuit; generating a context aware value of the electrical property based on the baseline value, the design layout and a derate table; and performing a static analysis of the circuit based on the context aware value of the electrical property. As discussed above, the derate table comprises information related to a sensitivity of the electrical property to a context parameter associated with the design layout. The baseline value of an electrical property may be determined based on an input slew and an output load of the circuit. An input slew may be determined based on a transition time for an input signal to increase from a predetermined voltage to another predetermined voltage.

In one embodiment, generating the context aware value of the electrical property includes: extracting at least one key context parameter for a cell in the circuit; determining, for each of the at least one key context parameter, an abutment environment associated with the cell based on the design layout of the circuit; determining an electrical property ratio based on the derate table and the abutment environment; and generating the context aware value of the electrical property by multiplying the electrical property ratio with the baseline value. As discussed above, the derate table provides a lookup table for mapping abutment environments of a cell to a corresponding electrical property ratio. As such, the electrical property ratio may be determined by at least one of: searching the derate table based on the abutment environment; and computing the electrical property ratio based on an interpolation. According to various embodiments, the static analysis may be performed based on a path or a graph connecting a plurality of cells in the circuit to generate a report based on the context aware value of the electrical property.

Figure 8:
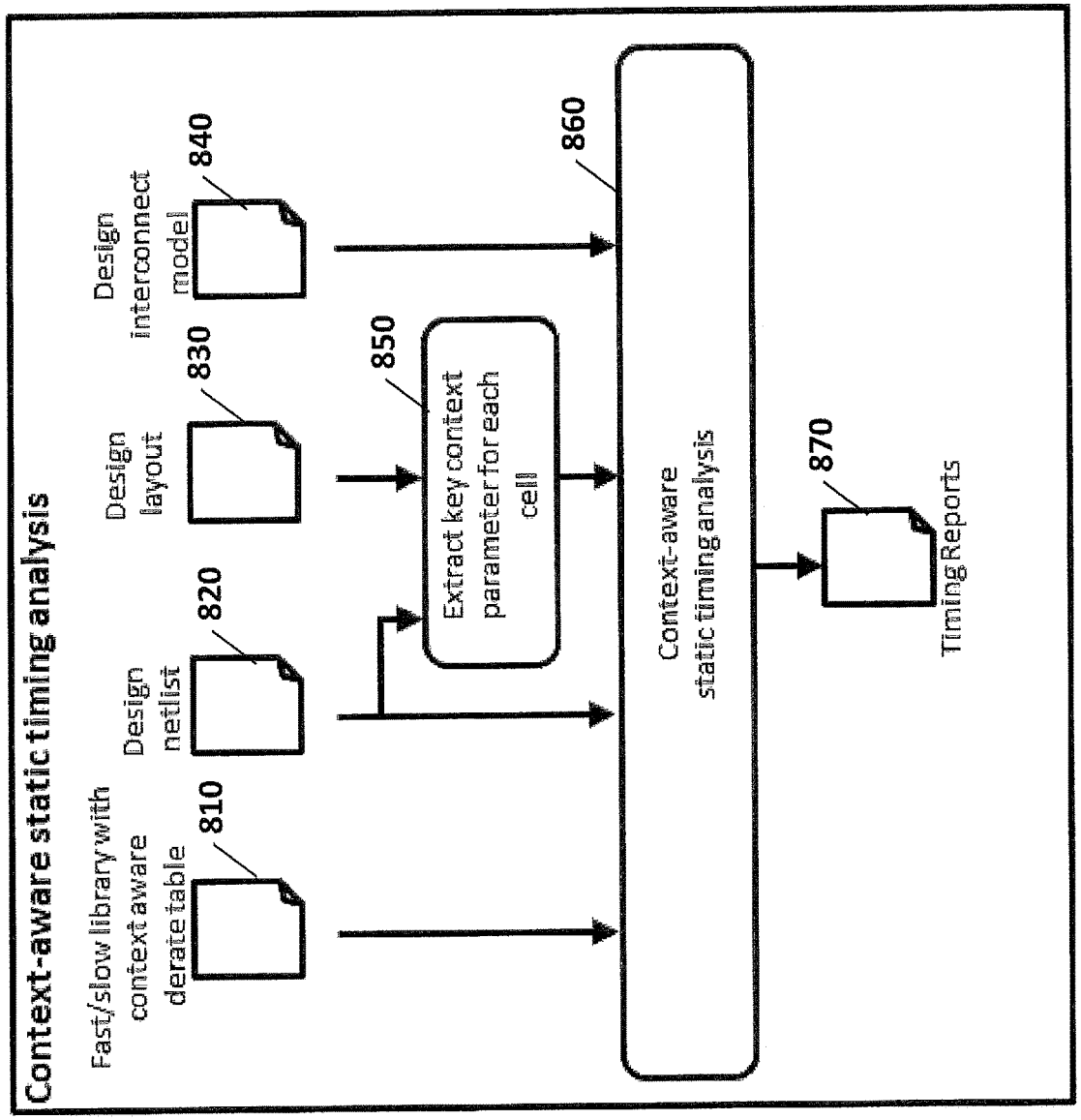
FIG. 8 illustrates an exemplary flow for context aware static timing analysis in a circuit design, in accordance with some embodiments of the present disclosure.

FIG. 8 illustrates an exemplary flow 800 for context aware static timing analysis in a circuit design, in accordance with some embodiments of the present disclosure. As shown in FIG. 8, key context parameters are extracted at operation 850 for each cell in a path or graph based on a design netlist 820 and a design layout 830 of the circuit. Then at operation 860, a static timing analysis is performed based on the fast and slow libraries with context aware derate tables 810, the design netlist 820, the extracted key context parameters 850, and a design interconnect model 840.

In one embodiment, the design netlist 820 and the design interconnect model 840 are end results of an APR run. The design netlist 820 describes the input and output pin of an APR block and connectivity between various standard cells. The design interconnect model 840 shows the parasitic RC for the metal routing between each of the standard cells.

As discussed above, the static timing analysis can take into consideration of the sensitivity of timing delay of each cell with respect to the key context parameters for the cell, based on a desired design layout of the circuit, and determine a context aware value of the timing delay using the context aware derate table, by tuning the baseline value of the timing delay with a ratio determined from the derate table. The operation 860 results in one or more timing reports 870 that can accurately reflect the timing delay information of the path or graph of interest based on the desired design layout of the circuit.

Figure 9:
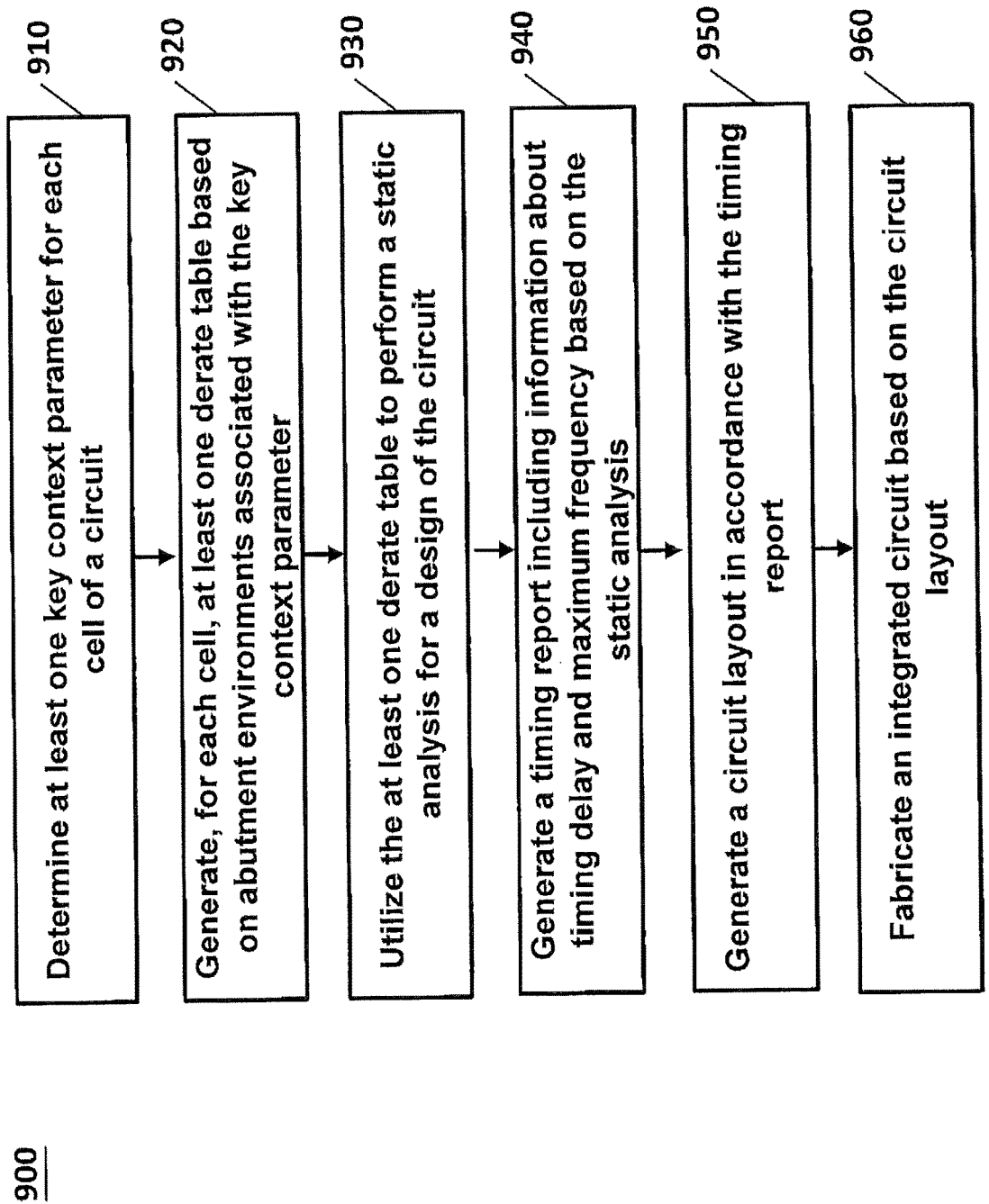
FIG. 9 illustrates a method for fabricating an integrated circuit with a layout design, in accordance with some embodiments of the present disclosure.

FIG. 9 illustrates a method 900 for fabricating an integrated circuit with a layout design, in accordance with some embodiments of the present disclosure. At operation 910, at least one key context parameter is determined for each cell of a circuit. In one embodiment, the at least one key context parameter is determined for a portion of cells in the circuit. At operation 920, at least one derate table is generated, for each cell, based on abutment environments associated with the key context parameter. At operation 930, the at least one derate table is utilized to perform a static analysis for a design of the circuit. At operation 940, a timing report including information about timing delay and maximum frequency is generated based on the static analysis. At operation 950, a circuit layout is generated in accordance with the timing report. At operation 960, an integrated circuit is fabricated based on the circuit layout. The order of operations in each of FIG. 2, FIG. 4, and FIG. 9 can be changed according to various embodiments of the present teaching.

Figure 10:
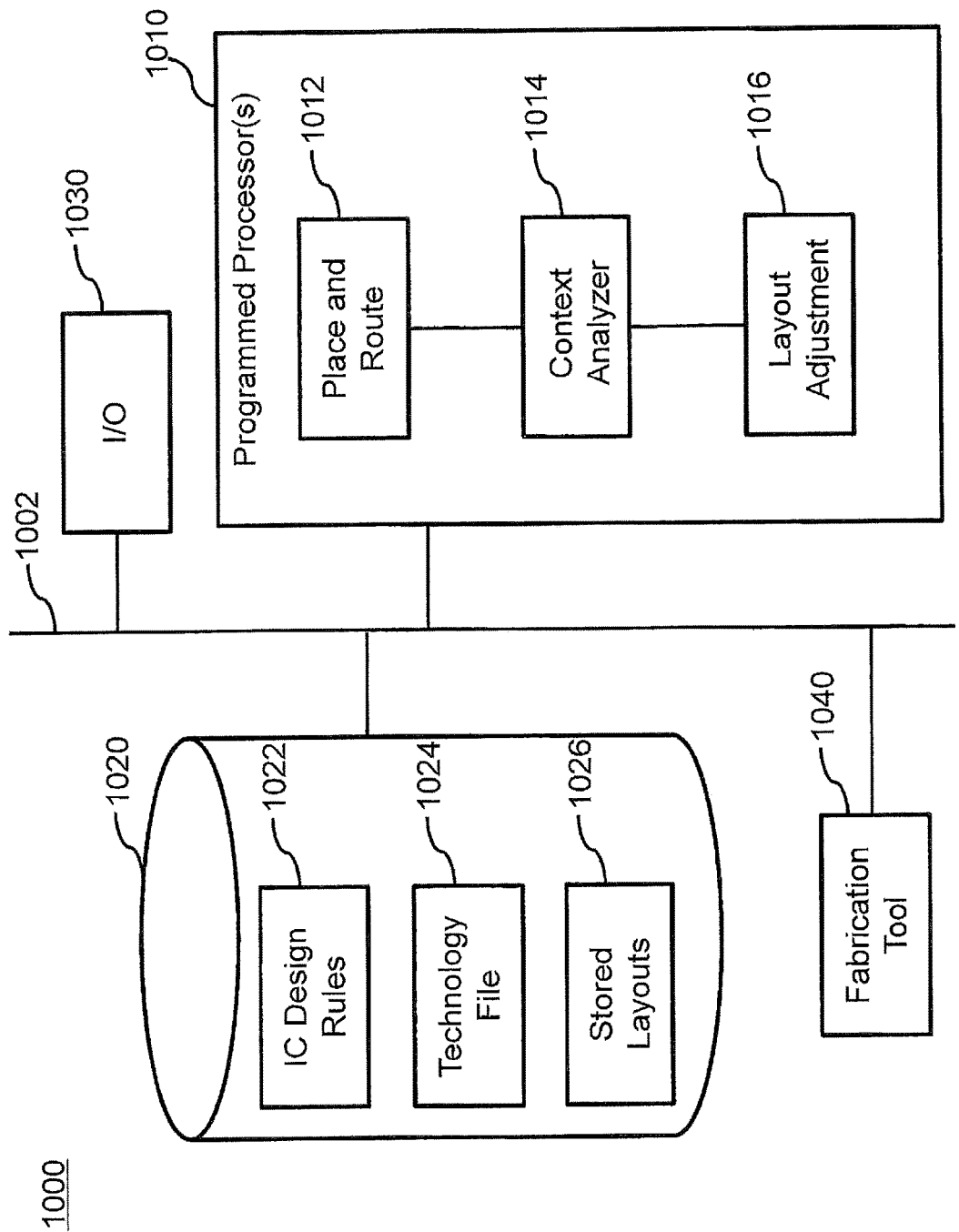
FIG. 10 is a block diagram of a system 1000 for fabricating an integrated circuit with a layout design, in accordance with some embodiments.

FIG. 10 is a block diagram of a system 1000 for fabricating an integrated circuit with a layout design, in accordance with some embodiments. The system 1000 includes one or more programmed processors 1010. In some embodiments, the layout design is performed by two or more application programs, each operating on a separate processor. In other embodiments, the operations of the layout design are all performed using one processor. Although FIG. 10 shows an allocation of the various tasks to specific modules, this is only one example. The various tasks may be assigned to different modules to improve performance, or improve the ease of programming.

In this example, the system 1000 includes an electronic design automation ("EDA") tool that may include a place and route tool 1012. The EDA tool is a special purpose computer formed by retrieving stored program instructions from a non-transient computer readable storage medium 1020 and executing the instructions on a general purpose processor 1010. Thus, the instructions configure the logic circuits of the processors 1010 to function as an EDA tool. Examples of the non-transient computer readable storage medium 1020 include, but are not limited to, hard disk drives (HDD), read only memories ("ROMs"), random access memories ("RAMs"), flash memories, or the like. The tangible, non-transient machine readable storage medium 1020 is configured to store data generated by the place and route tool 1012. The router of the place and route tool 1012 is capable of receiving a stored layout 1026 from the medium 1020 as a template for circuit design. Router 1012 may be equipped with a set of default IC design rules 1022 and technology file 1024 for the layout design.

In accordance with various embodiments, the system 1000 may also include a context analyzer 1014 configured for determining key context parameters and generating derate tables based on abutment environments associated with the key context parameters for each cell of a circuit; and a layout adjustment module 1016 configured for adjusting chip position and individual cells or blocks utilizing the derate tables to generate a circuit layout and a corresponding timing report. A newly designed layout may be stored in the non-transitory machine-readable storage medium 1020. The system 1000 may further include a fabrication tool 1040 that can physically implement the adjusted layout into an integrated circuit.

As shown in FIG. 10, the system 1000 also includes an input/output (I/O) 1030 configured to receive inputs and transmit outputs to external circuits. I/O 1030 is electrically connected to the one or more programmed processors 1010, the memory 1020, and the fabrication tool 1040 via a bus 1002.

In some embodiments, a method for designing a circuit is disclosed. The method includes: identifying at least one cell to be designed into the circuit; identifying at least one context parameter having an impact to layout dependent effect of the circuit; generating, for each cell of the at least one cell and for each context parameter of the at least one context parameter, a plurality of abutment environments associated with the cell; estimating, for each cell and each context parameter, a sensitivity of at least one electrical property of the cell to the context parameter by generating a plurality of electrical property values of the cell under the plurality of abutment environments; and determining whether each context parameter is a key context parameter for a static analysis of the circuit, based on the sensitivity of the at least one electrical property of each cell and based on at least one predetermined threshold.

In some embodiments, another method for designing a circuit is disclosed. The method includes: determining a baseline value of an electrical property associated with the circuit; obtaining a design layout of the circuit; generating a context aware value of the electrical property based on the baseline value, the design layout and a derate table, wherein the derate table comprises information related to a sensitivity of the electrical property to a context parameter associated with the design layout; and performing a static analysis of the circuit based on the context aware value of the electrical property.

In some embodiments, a system for designing a circuit is disclosed. The system includes: a non-transitory storage medium encoded with a set of instructions; and a hardware processor communicatively coupled with the non-transitory storage medium and configured to execute the set of instructions, the set of instructions being configured to cause the processor to: identify a subset of standard cells configured for designing the circuit; determine at least one key context parameter for cells in the subset, based on a sensitivity of at least one electrical property of the cells to the at least one key context parameter; generate at least one derate table based on the sensitivity of the at least one electrical property of the cells to the at least one key context parameter; and provide at least one cell library as well as the at least one derate table for performing a static analysis of the circuit.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand exemplary features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations are used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module"), or any combination of these techniques.

To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, module, etc. can be configured to perform one or more of the functions described herein. The term "configured to" or "configured for" as used herein with respect to a specified operation or function refers to a processor, device, component, circuit, structure, machine, module, signal, etc. that is physically constructed, programmed, arranged and/or formatted to perform the specified operation or function.

Furthermore, a person of ordinary skill in the art would understand that various illustrative logical blocks, modules, devices, components and circuits described herein can be implemented within or performed by an integrated circuit (IC) that can include a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A processor programmed to perform the functions herein will become a specially programmed, or special-purpose processor, and can be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present disclosure.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A system for designing a circuit, comprising:
a non-transitory storage medium encoded with a set of instructions; and
a hardware processor communicatively coupled with the non-transitory storage medium and configured to execute the set of instructions, the set of instructions being configured to cause the processor to:
identify a subset of standard cells configured for designing the circuit;
determine at least one key context parameter for cells in the subset, based on a sensitivity of at least one electrical property of the cells to the at least one key context parameter;
generate at least one derate table based on the sensitivity of the at least one electrical property of the cells to the at least one key context parameter; and
perform a static analysis of the circuit based on the at least one derate table.

2. The system of claim 1, wherein:
one of the at least one derate table is a lookup table mapping active region (AR) spacing values associated with a cell to time delay ratios associated with the cell.

3. The system of claim 2, wherein:
each of the time delay ratios is a ratio between a time delay value corresponding to a respective AR spacing value and a baseline time delay value corresponding to a baseline AR spacing value when the cell has no AR spacing.

4. The system of claim 1, wherein:
the at least one electrical property value comprises a plurality of electrical property values; and
the set of instructions is further configured to cause the processor to compute a ratio between each of the plurality of electrical property values and an electrical property value corresponding to a baseline abutment environment associated with the cell, to generate a plurality of ratios each of which corresponding to one of a plurality of abutment environments associated with the cell.

5. The system of claim 4, wherein the set of instructions is further configured to cause the processor to:
identify, for a plurality of context parameters, a maximum ratio and a minimum ratio among the plurality of ratios;
compare the maximum ratio to a first predetermined threshold;
compare the minimum ratio to a second predetermined threshold; and
identify one of the plurality of context parameters as a key context parameter, under at least one of following conditions: the maximum ratio is larger than or equal to the first predetermined threshold, or the minimum ratio is smaller than or equal to the second predetermined threshold.

6. The system of claim 5, wherein the set of instructions is further configured to cause the processor to, upon a determination that a context parameter is a key context parameter, generate at least one derate table based on the plurality of abutment environments associated with the key context parameter and based on the plurality of ratios corresponding to the plurality of abutment environments.

7. The system of claim 6, wherein:
the at least one electrical property comprises a plurality of electrical properties; and
the at least one derate table comprises a plurality of derate tables each of which is generated for a corresponding one of the plurality of electrical properties of the cell.

8. The system of claim 6, wherein:
the at least one electrical property comprises a plurality of electrical properties; and
the at least one derate table is a single table generated based on all of the plurality of electrical properties of the cell.

9. The system of claim 6, wherein the set of instructions is further configured to cause the processor to utilize the at least one derate table to perform the static analysis of the circuit during at least one of following stages of circuit design: automatic place and route (APR) and signoff.

10. The system of claim 1, wherein the set of instructions is further configured to cause the processor to:
determine whether the sensitivity of the at least one electrical property of the cell to a context parameter exceeds the at least one predetermined threshold; and
identifying the context parameter as a key context parameter when the sensitivity exceeds the at least one predetermined threshold.

11. A system, comprising:
a non-transitory storage medium encoded with a set of instructions; and
a hardware processor communicatively coupled with the non-transitory storage medium and configured to execute the set of instructions, the set of instructions being configured to cause the processor to:
identify at least one context parameter having an impact to a layout dependent effect of the circuit;
generate, for a cell to be designed into the circuit and for each context parameter of the at least one context parameter, a plurality of abutment environments associated with the cell;
estimate, for each context parameter, a sensitivity of at least one electrical property of the cell to the context parameter by generating a plurality of electrical property values of the cell under the plurality of abutment environments;

select, from the at least one context parameter, at least one key context parameter for a static analysis of the circuit, based on the sensitivity and at least one predetermined threshold; and generate a design layout for the circuit based on the static analysis of the circuit.

12. The system of claim 11, wherein the at least one context parameter comprises information related to at least one of: active region (AR) spacing effect associated with the cell, or a poly length associated with the cell.

13. The system of claim 11, wherein the at least one electrical property comprises information related to at least one of: a rising delay, a falling delay, a constraint, a leakage or a power associated with the cell.

14. The system of claim 11, wherein the set of instructions is further configured to cause the processor to compute, for the context parameter, a ratio between each of the plurality of electrical property values and an electrical property value corresponding to a baseline abutment environment associated with the cell, to generate a plurality of ratios each of which corresponding to one of the plurality of abutment environments associated with the cell.

15. The system of claim 14, wherein the set of instructions is further configured to cause the processor to:
identify, for one of the at least one context parameter, a maximum ratio and a minimum ratio among the plurality of ratios;
compare the maximum ratio to a first predetermined threshold;
compare the minimum ratio to a second predetermined threshold; and
identify the context parameter as a key context parameter, under at least one of following conditions: the maximum ratio is larger than or equal to the first predetermined threshold, or the minimum ratio is smaller than or equal to the second predetermined threshold.

16. The system of claim 14, wherein the set of instructions is further configured to cause the processor to, upon determining that a context parameter is a key context parameter, generate at least one derate table based on the plurality of abutment environments associated with the key context parameter and based on the plurality of ratios corresponding to the plurality of abutment environments.

17. A system, comprising:
a non-transitory storage medium encoded with a set of instructions; and
a hardware processor communicatively coupled with the non-transitory storage medium and configured to execute the set of instructions, the set of instructions being configured to cause the processor to:
identify at least one context parameter having an impact to layout dependent effect of the circuit;
generate, for a cell to be designed into the circuit and for each context parameter of the at least one context parameter, a plurality of abutment environments associated with the cell;
estimate, for each context parameter, a sensitivity of at least one electrical property of the cell to the context parameter by generating a plurality of electrical property values of the cell under the plurality of abutment environments;
select, from the at least one context parameter, at least one key context parameter for a static analysis of the circuit, based on the sensitivity and at least one predetermined threshold;
generate a design layout for the circuit based on the static analysis of the circuit;
upon a determination that a context parameter is a key context parameter, generate at least one derate table based on the plurality of abutment environments associated with the key context parameter and based on the plurality of ratios corresponding to the plurality of abutment environments; and
utilize the at least one derate table to perform the static analysis of the circuit during at least one of following stages of circuit design: automatic place and route (APR) and signoff.

18. The system of claim 17, wherein the set of instructions is further configured to cause the processor to:
determine whether the sensitivity of the at least one electrical property of the cell to the context parameter exceeds the at least one predetermined threshold; and
identify the context parameter as a key context parameter when the sensitivity exceeds the at least one predetermined threshold.

19. The system of claim 17, wherein:
the cell is a subset of standard cells configured for designing the circuit; and
the plurality of abutment environments is generated based on all of the standard cells.

20. The system of claim 17, wherein:
the at least one electrical property comprises a plurality of electrical properties; and
the at least one derate table comprises a plurality of derate tables each of which is generated for a corresponding one of the plurality of electrical properties of the cell.

* * * * *